US012701550B2

(12) United States Patent
Guo et al.

(10) Patent No.: US 12,701,550 B2
(45) Date of Patent: Aug. 4, 2026

(54) COMMUNICATION METHOD AND APPARATUS

(71) Applicant: HUAWEI TECHNOLOGIES CO., LTD., Shenzhen (CN)

(72) Inventors: Wenting Guo, Shenzhen (CN); Hongjia Su, Shanghai (CN); Lei Dong, Shanghai (CN); Lei Lu, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 300 days.

(21) Appl. No.: 18/432,488

(22) Filed: Feb. 5, 2024

(65) Prior Publication Data

US 2024/0179681 A1     May 30, 2024

Related U.S. Application Data

(63) Continuation of application No. PCT/CN2022/109494, filed on Aug. 1, 2022.

(30) Foreign Application Priority Data

Aug. 5, 2021     (CN) .......................... 202110894164.3

(51) Int. Cl.
| | |
|---|---|
| *H04W 72/02* | (2009.01) |
| *H04L 5/00* | (2006.01) |
| *H04W 72/0446* | (2023.01) |
| *H04W 74/0808* | (2024.01) |

(52) U.S. Cl.
CPC ........... *H04W 72/02* (2013.01); *H04L 5/0085* (2013.01); *H04W 72/0446* (2013.01); *H04W 74/0808* (2013.01)

(58) Field of Classification Search
CPC ............. H04W 72/02; H04W 72/0446; H04W 74/0808; H04W 72/25; H04W 92/18; H04L 5/0085
See application file for complete search history.

(56) References Cited

U.S. PATENT DOCUMENTS

| | | | |
|---|---|---|---|
| 2020/0029340 A1* | 1/2020 | He | H04W 72/044 |
| 2020/0374861 A1 | 11/2020 | Shilov et al. | |
| 2023/0389053 A1* | 11/2023 | Wu | H04W 72/02 |
| 2023/0403733 A1* | 12/2023 | Wu | H04W 72/542 |
| 2024/0032068 A1* | 1/2024 | Zhang | H04B 17/328 |
| 2024/0147514 A1* | 5/2024 | Yao | H04W 72/02 |
| 2026/0012976 A1* | 1/2026 | Wu | H04W 74/0808 |

FOREIGN PATENT DOCUMENTS

| | | |
|---|---|---|
| EP | 3445107 A1 | 2/2019 |
| WO | 2018201390 A1 | 11/2018 |

OTHER PUBLICATIONS

Intel Corporation, "UE-Autonomous Resource Allocation for NR V2X Sidelink Communication", 3GPP TSG RAN WG1 Meeting #98, R1-1908635, XP051765243, Aug. 26-30, 2019, 28 pages.

* cited by examiner

*Primary Examiner* — Brian D Nguyen
(74) *Attorney, Agent, or Firm* — Maier & Maier, PLLC

(57) ABSTRACT

A method includes: determining a start time point of a resource selection window based on a first time point for triggering resource selection, and selecting a transmission resource in the resource selection window. A time interval between the start time point of the resource selection window and the first time point is not less than duration required by a terminal device to perform first-type listen-before-talk (LBT).

17 Claims, 6 Drawing Sheets

S901

Determine a start time point of a resource selection window

S902

Select a transmission resource in the resource selection window

Signal

Random backoff

Busy channel

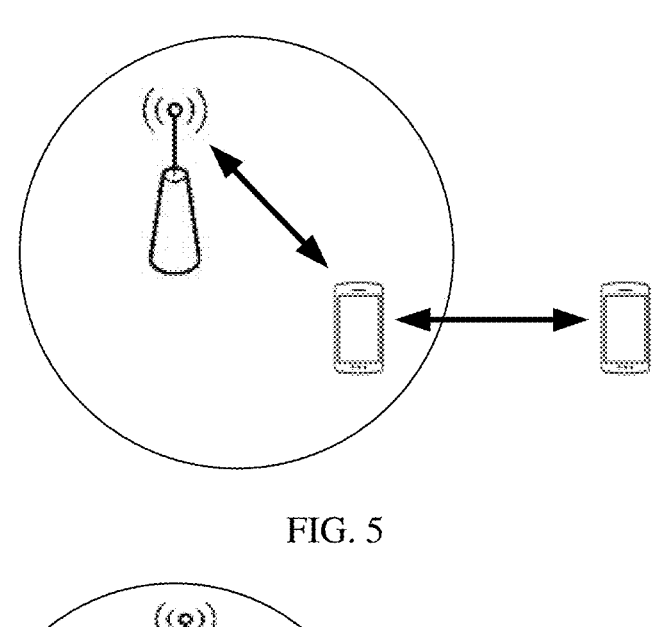
FIG. 5
FIG. 6
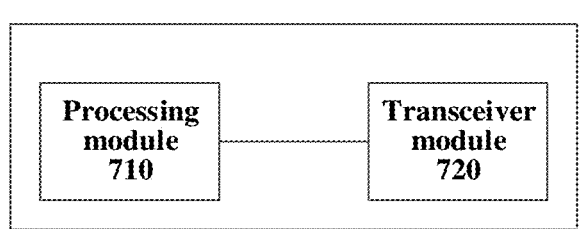
FIG. 7

COMMUNICATION METHOD AND APPARATUS

CROSS-REFERENCE TO RELATED APPLICATIONS

This application is a continuation of International Application No. PCT/CN 2022/109494, filed on Aug. 1, 2022, which claims priority to Chinese Patent Application No. 202110894164.3, filed on Aug. 5, 2021. The disclosures of the aforementioned applications are hereby incorporated by reference in their entireties.

TECHNICAL FIELD

The embodiments relate to the field of communication technologies, and to a communication method and apparatus.

BACKGROUND

Enabling sidelink (SL) communication in an unlicensed spectrum is an important evolution direction in development of a communication system. A terminal device needs to perform listen-before-talk (LBT) when performing communication in the unlicensed spectrum. To be specific, before accessing a channel and starting to send data, the terminal device needs to learn whether the channel is idle through listening. If the channel has been idle for a specific time period, the terminal device may occupy the channel. If the channel is not idle, the terminal device may occupy the channel only after the channel is restored to be idle again.

Currently, resource reservation is supported in the SL communication. To be specific, the terminal device may reserve, in a resource selection window, a resource to be used in a future time period, and indicate, in sent control information (for example, sidelink control information (SCI)), resource reservation information for the future time period. After receiving the control information, another user may exclude the reserved resource indicated by the control information, to avoid resource collision. However, during sidelink communication in the unlicensed spectrum, the terminal device needs to perform LBT before performing communication on the reserved resource. To be specific, the terminal device needs to determine, based on a randomly generated initial value of a backoff counter, required waiting duration. Initial values generated by terminal users are different. Consequently, whether LBT can be successfully performed before communication is performed on the reserved resource is random, and the terminal device may fail to perform communication on the resource reserved by the terminal device.

SUMMARY

The embodiments provide a communication method and apparatus which can improve resource utilization.

According to a first aspect, the embodiments provide a communication method. The method may be performed by a terminal device, or may be performed by a combined device or part that has a function of the terminal device, or may be performed by a chip or a circuit system (for example, a processor, a baseband chip, or a chip system) used in the terminal device. The method includes: determining a start time point of a resource selection window based on a first time point for triggering resource selection, and selecting a transmission resource in the resource selection window. A time interval between the start time point of the resource selection window and the first time point is not less than duration required by the terminal device to perform first-type listen-before-talk (LBT).

In this embodiment, the start time point of the resource selection window is determined based on the duration required for the duration of the first-type LBT, so that as many resources in the resource selection window as possible are located after the LBT ends. Therefore, a probability that LBT succeeds before communication is performed on the reserved resource can be increased, thereby improving resource utilization. In addition, according to the foregoing solution, a receive-side terminal device may not need to detect information on a resource before a resource on which a transmit-side terminal device successfully performs LBT, so that power consumption of the peer terminal device for receiving information can be reduced.

In a possible implementation, a quantity $T_1$ of slots corresponding to the time interval between the start time point of the resource selection window and the first time point may meet:
when $$T_{proc,1}^{SL} > T, T \le T_1 \le T_{proc,1}^{SL};$$

and/or
when $$T_{proc,1}^{SL} \ge T, T_1 = T.$$

$$T_{proc,1}^{SL}$$

is a predefined first processing duration, and T is a quantity of slots corresponding to first duration.

In a possible implementation, the first duration is determined based on an initial value of a random backoff counter corresponding to the first-type LBT. In the foregoing implementation, a case in which the random backoff counter is interrupted during counting may not be considered, and estimating the first duration based on the initial value of the random backoff timer can reduce calculation complexity, thereby saving a computing resource.

In a possible implementation, the first duration may be determined based on an initial value of a random backoff counter corresponding to the first-type LBT and a first interval during the first-type LBT. In the foregoing implementation, continuous idle duration (such as the first interval) of a channel that needs to be listened during LBT is considered, so that the probability that the LBT succeeds before communication is performed on the reserved resource can be further increased, thereby improving resource utilization.

In a possible implementation, the first interval may be idle duration of the channel during first-type LBT, for example continuous idle duration of the channel that the terminal device needs to wait for when performing the first-type LBT.

In a possible implementation, the first interval may be DIFS duration in the Wi-Fi protocol, or the first interval may be defer duration in the 3GPP protocol.

In a possible design, the quantity T of slots corresponding to the first duration meets:

$$T=\lceil(\text{counter}*9e^{-3})/2^{-\mu}\rceil.$$

where counter is the initial value of the random backoff counter, and $\mu$ corresponds to a subcarrier spacing.

In a possible implementation, when the transmission resource is selected in the resource selection window, a candidate resource that is in the resource selection window and that is located after an end time point of the LBT may be selected as the transmission resource in a chronological front-to-back order. In the foregoing manner, the probability that the LBT succeeds before communication is performed on the reserved resource can be increased, thereby increasing a probability that communication is performed on the selected resource.

In a possible implementation, the first duration may be determined based on an initial value of a random backoff counter corresponding to the first-type LBT and second duration. The second duration is a quantity of slots occupied by N reserved resources. Alternatively, the second duration is determined based on the quantity of slots occupied by the N reserved resources and N first intervals, the first interval is idle duration of a channel after a corresponding reserved resource, the first interval and the corresponding reserved resource are continuous in time domain, the N reserved resources are resources reserved in the first duration, and N is a positive integer.

In a random backoff process of the terminal device, if another terminal device sends a signal in a slot, the random backoff counter is interrupted. Consequently, time required for the LBT success is increased. In the foregoing solution, duration for which the random backoff counter is interrupted is considered when the start time point of the resource selection window is determined, so that the probability that the LBT succeeds before communication is performed on the reserved resource can be further increased, thereby increasing a possibility that the terminal device sends information on the selected resource in the resource selection window.

In a possible implementation, the quantity T of slots corresponding to the first duration may meet:

$$T=\left(\left\lceil\frac{\text{counter}*9e^{-3}}{2^{-\mu}}\right\rceil+\sum\nolimits_{1}^{N}\text{reservation}_i\right).$$

where counter is the initial value of the random backoff counter, $\mu$ corresponds to a subcarrier spacing, and reservation$_i$ is a quantity of slots occupied by an $i^{th}$ reserved resource in the N reserved resources. In the foregoing implementation, the duration for which the random backoff counter is interrupted may be determined based on the quantity of slots occupied by the reserved resource, so that complexity is low, thereby saving the computing resource and reducing power consumption.

In a possible implementation, the quantity T of slots corresponding to the first duration may meet:

$$T=\left(\left\lceil\frac{\text{counter}*9e^{-3}+N\times t}{2^{-\mu}}\right\rceil+\sum\nolimits_{1}^{N}\text{reservation}_i\right).$$

where counter is the initial value of the random backoff counter, $\mu$ corresponds to a subcarrier spacing, reservation$_i$ is a quantity of slots occupied by an $i^{th}$ reserved resource in the N reserved resources, and t is the first interval. In the foregoing implementation, duration (such as the first interval) required for re-performing LBT each time after the random backoff counter is interrupted is considered, so that the duration for which the random backoff counter is interrupted is more accurate, and the probability that the LBT succeeds before communication is performed on the reserved resource can be further increased.

In a possible implementation, the N reserved resources are indicated by M pieces of sidelink control information in a resource listening window, and M is a positive integer. A reference signal received power (RSRP) corresponding to each of the M pieces of sidelink control information is greater than a first threshold, and the first threshold is an RSRP threshold used for resource selection. Alternatively, a received signal strength indicator (RSSI) corresponding to each of the M pieces of sidelink control information is greater than a second threshold, and the second threshold is an RSSI threshold used for LBT. Alternatively, an RSRP corresponding to each of the M pieces of sidelink control information is greater than a first threshold, and an RSSI corresponding to each of the M pieces of sidelink control information is greater than a second threshold. According to the foregoing implementation, a resource that causes large interference to the terminal device may be reserved, so that resource utilization can be improved.

According to a second aspect, an embodiment provides a communication apparatus, to implement the method in any one of the first aspect or the possible implementations of the first aspect. The apparatus includes a corresponding unit or part configured to perform the foregoing method. The unit included in the apparatus may be implemented by software and/or hardware. The apparatus may be, for example, a terminal device, or a part, a baseband chip, a chip system, a processor, or the like that can support the terminal device in implementing the foregoing method.

For example, the communication apparatus may include a processing unit (or referred to as a processing module), and may further include a modular component such as a transceiver unit (or referred to as a communication module or a transceiver module). These modules may perform the method in any one of the first aspect or the possible implementations of the first aspect. When the communication apparatus is the terminal device, the transceiver unit may be a transmitter and a receiver, or a transceiver obtained by integrating the transmitter and the receiver. The transceiver unit may include an antenna, a radio frequency circuit, and the like. The processing unit may be a processor, for example, a baseband chip. When the communication apparatus is a part having a function of the foregoing terminal device, the transceiver unit may be a radio frequency unit, and the processing unit may be a processor. When the communication apparatus is the chip system, the transceiver unit may be an input/output interface of the chip system, and the processing unit may be a processor of the chip system, for example, a central processing unit (CPU).

The transceiver unit may be configured to perform a receiving and/or sending action in any one of the first aspect or the possible implementations of the first aspect. The processing unit may be configured to perform an action other than receiving and sending in any one of the first aspect or the possible implementations of the first aspect, for example, determining a start time point of a resource selection window, and selecting a transmission resource in the resource selection window.

According to a third aspect, a communication apparatus is provided. The communication apparatus includes one or more processors. The one or more processors are coupled to a memory, and may be configured to execute a program or instructions in the memory, so that the apparatus performs the method in any one of the first aspect or the possible implementations of the aspect. Optionally, the apparatus further includes one or more memories. Optionally, the apparatus further includes a communication interface, and the processor is coupled to the communication interface.

According to a fourth aspect, a non-transitory computer-readable storage medium is provided. The non-transitory computer-readable storage medium is configured to store computer instructions, and when the computer instructions are run on a computer, the computer is enabled to perform the method in any one of the first aspect or the possible implementations of the first aspect.

According to a fifth aspect, a computer program product including instructions is provided. The computer program product is configured to store computer instructions, and when the computer instructions are run on a computer, the computer is enabled to perform the method in any one of the first aspect or the possible implementations of the first aspect.

According to a sixth aspect, a processing apparatus is provided. The processing apparatus is coupled to a memory, and the processing apparatus invokes a program in the memory to perform the method in any one of the first aspect or the possible implementations of the first aspect. The processing apparatus may include, for example, a chip system.

The chip system in the foregoing aspects may be a system on chip (SoC), a baseband chip, or the like. The baseband chip may include a processor, a channel encoder, a digital signal processor, a modem, an interface module, and the like.

BRIEF DESCRIPTION OF DRAWINGS

FIG. 3 is a schematic diagram of random backoff according to an embodiment on;

FIG. 5 is a schematic diagram of another network architecture according to an embodiment;

FIG. 6 is a schematic diagram of another network architecture according to an embodiment;

FIG. 7 is a schematic diagram of a structure of a communication apparatus according to an embodiment;

DETAILED DESCRIPTION OF EMBODIMENTS

Figure 1:
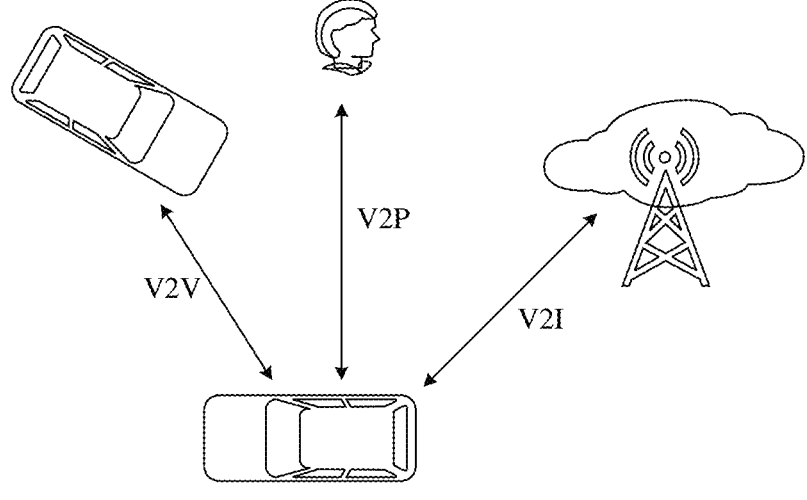
FIG. 1 is a schematic diagram of V2X communication according to an embodiment.

The following further describes in detail embodiments with reference to the accompanying drawings.

The following describes some terms in embodiments, to facilitate understanding of a person skilled in the art.

(1) Terminal device: The terminal device includes a device that provides a voice and/or data connectivity for a user. For example, the terminal device includes a device that provides a voice for the user, includes a device that provides data connectivity for the user, or includes a device that provides a voice and data connectivity for the user. For example, the terminal device may include a handheld device with a wireless connection function or a processing device connected to a wireless modem. The terminal device may communicate with a core network through a radio access network (RAN), and exchange a voice or data with the RAN, or exchange the voice and the data with the RAN. The terminal device may include user equipment (UE), a wireless terminal device, a mobile terminal device, a device-to-device (D2D) communication terminal device, a vehicle-to-everything (V2X) terminal device, a machine-to-machine/machine-type communication (M2M/MTC) terminal device, an because internet of things (IOT) terminal device, a subscriber unit (subscriber unit), a subscriber station, a mobile station (mobile station), a remote station (remote station), an access point (AP), a remote terminal (remote terminal), an access terminal, a user terminal (user terminal), a user agent (user agent), a user device, or the like. For example, the terminal device may include a mobile phone (or referred to as a " "cellula"" phone), a computer with the mobile terminal device, or a portable, pocket-sized, hand-held, or computer built-in mobile apparatus. For example, the terminal device may be a device such as a personal communication service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

A terminal device in a V2X technology may be a road side unit (RSU). The RSU may be a fixed infrastructure entity that supports a V2X application, and may exchange a message with another entity that supports the V2X application. For example, the road side unit may exchange, through a PC5 interface, a message with the another entity that supports the V2X application.

The terminal device in the V2X technology may alternatively be an entire vehicle, a communication module (for example, a communication chip or a chip system) in the entire vehicle, a remote information processor (telematics BOX, TBOX), or the like.

By way of example, and not limitation, in embodiments, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs).

In embodiments, the terminal device may further include a relay. Alternatively, it may be understood that any device that can perform data communication with a base station may be considered as a terminal device.

In embodiments, an apparatus configured to implement a function of the terminal device may be a terminal device; or may be an apparatus, for example, a part or a component having a communication function, or a chip system, used in the terminal device to support the terminal device in implementing the function. The apparatus may be installed in the terminal device. In embodiments, the chip system may be formed by a chip, or may include the chip and another discrete component. In the solutions provided in embodiments, an example in which the apparatus configured to implement the function of the terminal is the terminal device is used to describe the solutions provided in embodiments.

(2) Network device: The network device includes, for example, an access network (AN) device such as a base station (for example, an access point), and may be a device that communicates with a wireless terminal device over an air interface through one or more cells in an access network. Alternatively, for example, a network device in the V2X technology is a base station-type RSU. The base station may be configured to perform conversion between a received over-the-air frame and an internet protocol (IP) packet, and serve as a router between the terminal device and other parts of the access network. The other parts of the access network may include an IP network. The base station-type RSU may be a fixed infrastructure entity that supports the V2X application, and may exchange a message with another entity that supports the V2X application. For example, the base station-type road side unit may exchange, through a Uu interface, a message with the another entity that supports the V2X application. The network device may further coordinate attribute management of the air interface. For example, the network device may include an evolved NodeB (NodeB, eNB, or e-NodeB, evolved Node B) in an LTE system or a long term evolution-advanced (LTE-A) system, may include a next generation NodeB (gNB) in a 5th generation (5G) mobile communication technology NR system (NR system), or may include a central unit (CU) and/or a distributed unit (DU) in a cloud access network (Cloud RAN) system. This is not limited. For example, the network device may be a CU, a DU, or an integration of the CU and the DU in the Cloud RAN system.

The network device may further include a core network device, and the core network device includes, for example, an access and mobility management function (AMF).

Because embodiments relate to the access network, unless otherwise specified, the network device refers to the access network device in the following descriptions.

In embodiments, an apparatus configured to implement a function of the network device may be a network device, or may be an apparatus, for example, a chip system, that can support the network device in implementing the function, and the apparatus may be installed in the network device. In the solutions provided in embodiments, an example in which the apparatus configured to implement the function of the network device is the network device is used to describe the solutions provided in embodiments.

(3) V2X: The V2X refers to interconnection between a vehicle and the outside, and is a basic and key technology of future intelligent vehicles, autonomous driving, and intelligent transportation systems. The V2X optimizes a specific application requirement of the V2X based on a conventional device-to-device (D2D) technology. This requires an access delay of a V2X device to be further reduced and a resource collision problem to be resolved.

The V2X further includes several application requirements such as vehicle-to-vehicle (V2V), vehicle-to-infrastructure (V2I), and vehicle-to-pedestrian (V2P) direct communication, and vehicle-to-network (V2N) communication interaction. As shown in FIG. 1, the V2V refers to communication between vehicles, the V2P refers to communication between a vehicle and a person (including a pedestrian, a bicycle rider, a driver, or a passenger), the V2I refers to communication between a vehicle and a network device, where for example, the network device is an RSU. In addition, the V2N may be included in the V2I, and the V2N refers to communication between a vehicle and a base station/network.

(4) Resource selection window: The resource selection window is slots corresponding to $[n+T_1, n+T_2]$ after the terminal device triggers resource selection. n is a time point for the terminal device to trigger resource selection, such as a time point for triggering a resource selection process is triggered. The resource selection process may be a process in which the terminal device determines a PSSCH resource to be reported to a higher layer, or a process in which the terminal device determines a resource subset from resources selected by the higher layer for PSSCH/PSCCH transmission. $T_1$ is determined by the terminal device, and is for the terminal device to determine a processing delay of processing a listening result and determining a candidate resource after the time point for triggering resource selection. For example, $T_1$ may meet $$0 \le T_1 \le T_{proc,1}^{SL}, \text{ and } T_{proc,1}^{SL}$$

is a maximum value of $T_1$ as defined in a standard. In an example, $$T_{proc,1}^{SL}$$

may be defined in Table 1. $\mu$ may be configured based on a subcarrier spacing (subcarrier spacing, SCS) corresponding to an SL bandwidth part (BWP). For example, $\mu$ may be defined in Table 2. $T_2$ is determined by the terminal device, and $T_2$ is a value less than a packet delay budget (PDB) required by a to-be-sent packet.

9

TABLE 1

| μ | $T_{proc,1}^{SL}$ [slots] |
|---|---|
| 0 | 3 |
| 1 | 5 |
| 2 | 9 |
| 3 | 17 |

TABLE 2

| μ | Subcarrier spacing (kHz) |
|---|---|
| 0 | 15 |
| 1 | 30 |
| 2 | 60 |
| 3 | 120 |
| 4 | 240 |

(5) Resource listening window: The resource listening window is a slot set, and is a basis for sensing by the terminal device. When the terminal device triggers resource selection at the time point n, the terminal device determines, based on information carried in correctly received SCI in a corresponding resource listening window, whether a candidate resource in the resource selection window has been reserved, that is, whether the candidate resource is available. A time range of the resource listening window is $[n-t_0, n-t_{proc,0}]$. $t_0$ is a boundary value of the resource listening window, and a specific value is configured or preconfigured by a network side. For example, a time value of $t_0$ may be 1100 ms or 100 ms (or may be another value). For example, if the subcarrier spacing is 15 kHz, $t_0=1100$ slots or 100 slots. For example, if the subcarrier spacing is 60 kHz, $t_0=4400$ slots or 400 slots. $t_{proc,0}$ is time for the terminal device to process the listening result, and $t_{proc,0}$ has a maximum value in different subcarrier spacings as defined in a standard. Based on different capabilities of terminal devices, a terminal device may determine a value of $t_{proc,0}$ when a maximum value constraint is met, and $t_{proc,0} \geq 0$.

Figure 2:
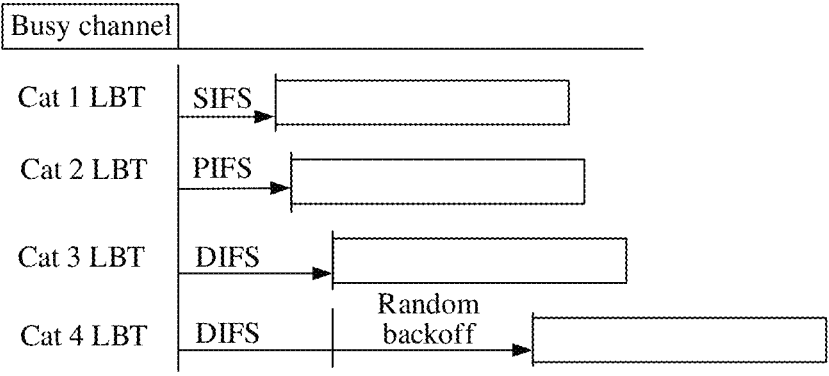
FIG. 2 is a schematic diagram of four categories of LBT according to an embodiment.

(6) LBT: In a wireless communication system, different frequency bands that are used may be classified into licensed frequency bands and unlicensed frequency bands. In an unlicensed frequency band, a sending node needs to perform LBT during communication. For example, before accessing a channel and starting to send data, the sending node needs to learn whether the channel is idle (idle) through listening. If the channel is not idle, the sending node cannot send a signal on the channel. If the channel has been idle and idle time meets an LBT requirement, the sending node may occupy the channel. The following describes four channel access types, and a difference between the four channel access types is that required waiting duration is different, as shown in FIG. 2.

In a first channel access manner (corresponding to Cat 1 LBT in the Wi-Fi protocol or Type 2B type LBT in the 3GPP protocol), the sending node performs sending after a short switching interval. For example, the sending node accesses the channel after waiting for continuous short interframe interval (the short inter-frame space, SIFS) duration for which the channel is idle. For example, the SIFS includes a slot of 9 μs. When the terminal device detects that the channel is idle for at least five microseconds in the slot of 9 μs, it may be considered that the channel is idle within the SIFS duration. A delay defined by the SIFS may include a delay of propagation of a radio wave carrying a signal in space, a signal processing delay of a user at a receiving end, and a receive/transmit switching delay of the user at the receiving end.

In a second channel access manner (corresponding to Cat 2 LBT in the Wi-Fi protocol or Type 2A type LBT in the 3GPP protocol), the sending node performs LBT without random backoff. For example, the sending node accesses the channel after waiting for continuous point coordination function interframe space (point coordination function interframe space, PIFS) duration for which the channel is idle. The PIFS may be equal to (SIFS+slotTime), and slotTime is a length of a slot, and may last for nine microseconds in time. In the second channel access manner, before the sending node accesses the channel, duration for which the channel is detected to be idle is deterministic.

In a third channel access manner (corresponding to Cat 3 LBT in the Wi-Fi protocol), the sending node accesses the channel after waiting for continuous distributed coordination function interframe space (distributed coordination function interframe space, DIFS) duration for which the channel is idle. The DIFS may be equal to (SIFS+2*slotTime). That the sending node successfully accesses the channel may be referred to as a DIFS success.

Figure 3:
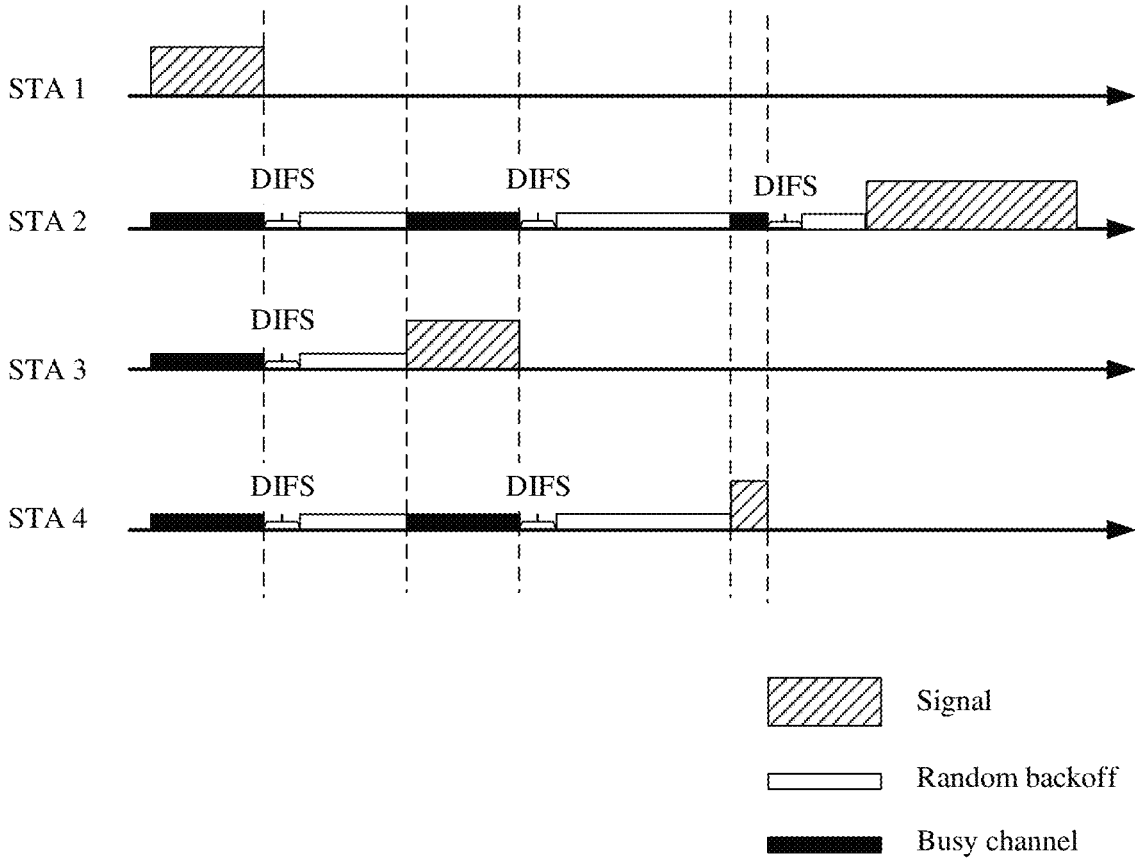

In a fourth channel access manner (corresponding to Cat 4 LBT in the Wi-Fi protocol or Type 1 type LBT in the 3GPP protocol), after determining that the channel is idle for continuous DIFS duration, the sending node accesses the channel after waiting, according to a random backoff mechanism, for random backoff duration for which the channel is idle. The random backoff mechanism requires the sending node to select an initial value of a random backoff count (random backoff count). The initial value of the random backoff count indicates a quantity of slotTime that the sending node needs to wait after the DIFS success and for which the channel is idle. slotTime may be a minimum time granularity for channel resource sensing on the unlicensed frequency band. After determining that the channel is idle for continuous DIFS duration, the sending node starts a random backoff counter to start backoff counting. An initial value of the random backoff counter is the initial value of the random backoff count selected by the sending node. When the sending node determines that the channel is idle for continuous slotTime duration, a value of the random backoff counter is decreased by 1. Otherwise, the sending node determines that the channel is in a busy state, the random backoff counter is interrupted, and a current value of the random backoff counter is recorded. After the random backoff counter is interrupted, the sending node starts listening again until the DIFS success, and the random backoff counter continues to perform a decrement operation. When the value of the random backoff counter decreases to 0, it is determined that access succeeds, and the sending node sends a signal on the channel (or referred to as accessing the channel, or using the channel, or occupying the channel). As shown in FIG. 3, it is assumed that there are four sending nodes in a space range: STA 1, STA 2, STA 3, and STA 4. All the four sending nodes can receive signals sent by each other, and energy of the received signals is large and greater than a threshold. For example, when one sending node is sending a signal, channels of the other sending nodes are all detected as being in a busy state. Assuming that STA 1 starts to send a signal on a channel in the unlicensed frequency band at an initial moment, the other sending nodes perform LBT. For example, a value of a random backoff counter randomly generated by STA 2 is the largest, a value of a random backoff counter randomly generated by STA 4 is smaller, and a value of a random backoff counter randomly generated by STA 3 is the smallest. After sending of the signal of STA 1 is completed, the channels of the other sending nodes are all detected as being in an idle state. After duration defined by the DIFS, the random backoff counters of STA 2, STA 3, and STA 4 all start to count in a decremental manner. However, the value of the random backoff counter of STA 3 is the smallest and first decreases to 0, and STA 3 sends data. After STA 3 starts to send a signal, STA 2 and STA 4 detect that the channels are in the busy state again. In this case, the values of the random backoff counters stop decreasing. STA 2 and STA 4 continue to perform energy detection until the channels are in the idle state (in other words, sending of the signal of STA 3 is completed), and then the values of the random backoff counters start to decrease again. because the value of the random backoff counter of STA 4 is less than the value of the random backoff counter of STA 2, the value of the random backoff counter of STA 4 decreases to 0 and STA 4 sends data. After STA 4 starts to send a signal, STA 2 detects that the channel is in the busy state again, and in this case, the value of the random backoff counter stops decreasing again. STA 2 continues to perform energy detection until the channel is in the idle state (in other words, sending of the signal of STA 4 is completed), and then the value of the random backoff counter starts to decrease again until the value of the random backoff counter decreases to 0, and then STA 2 starts to send a signal.

(7) Initial value of the random backoff count: The initial value of the random backoff count indicates a quantity of slotTime that the sending node needs to wait after the DIFS success and for which the channel is idle. The initial value of the random backoff count is a positive integer randomly selected by the sending node within a contention window [0, CW], and is evenly distributed within the window, that is, $0 \le$ random backoff count $\le CW$. CW represents a contention window length, and an initial value of CW is $CW_{min}$. When a user performs invalid data sending, a value of CW is doubled, that is, $CW=CW*2$, until $CW=CW_{max}$. The invalid data sending indicates that the sending node does not receive an ACK response fed back by a receiving node. For example, values of $CW_{min}$ and $CW_{max}$ may be shown in Table 3. The values of $CW_{min}$ and $CW_{max}$ may be related to channel access priorities p. Different priorities correspond to different $CW_{min,p}$ and $CW_{max,p}$, and allowed maximum access duration (such as maximum continuous use duration of the channel) $T_{ulm\ cot,p}$ is different.

TABLE 3

| Channel access priority (p) | $CW_{min, p}$ | $CW_{max, p}$ | $T_{ulm\ cot, p}$ | Allowed contention window length |
|---|---|---|---|---|
| 1 | 3 | 7 | 2 ms | {3, 7} |
| 2 | 7 | 15 | 4 ms | {7, 15} |
| 3 | 15 | 1023 | 6 ms or 10 ms | {15, 31, 63, 127, 255, 511, 1023} |
| 4 | 15 | 1023 | 6 ms or 10 ms | {15, 31, 63, 127, 255, 511, 1023} |

In embodiments", "at le"st one" means one or mor", and "a plura"ity of" means two or more than two. Th" term "and/or" describes an association relationship for describing associated objects and represents that three relationships may exist. For example, A and/or B may represent the following cases: only A exists, both A and B exist, and only B exists, where A and B may be singular or plural. The cha"a"ter "/" generally indica"es"an "or" relationship between the associated objects. At least one of the following items (pieces) or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be in a singular form or a plural form.

Unless otherwise stated on the contrary, ordinal terms s"ch as" "firs" and "second" mentioned in embodiments are used to distinguish between a plurality of objects, and are not intended to limit sizes, content, a sequence, a time sequence, priorities, importance degrees, or the like of the plurality of objects. For example, a first threshold and a second threshold are merely for distinguishing between different thresholds, and do not indicate different priorities, different importance degrees, or the like of the two thresholds.

The foregoing describes some noun concepts used in embodiments. The following describes features of embodiments.

Currently, resource reservation is supported in sidelink communication. For example, the terminal device may reserve, in the resource selection window, a resource to be used in a future time period. In an unlicensed spectrum, the sending node needs to perform LBT during communication. Therefore, when the terminal device performs sidelink communication in the unlicensed spectrum, the terminal device needs to perform LBT before performing communication on the reserved resource. For example, the terminal device needs to determine, based on a randomly generated initial value of the backoff counter, required waiting duration. Initial values generated by terminal users are different. Consequently, whether LBT can be successfully performed before communication is performed on the reserved resource is random, and in the fourth channel access manner (such as the Cat 4 LBT in the Wi-Fi protocol or the Type 1 type LBT in the 3GPP protocol), the random backoff counter may be interrupted when the terminal device performs LBT. As a result, whether the terminal device can successfully perform LBT before communication is performed on the resource reserved by the terminal device is random, and the terminal device may fail to perform communication on the resource reserved by the terminal device.

Based on this, embodiments provide a communication method and apparatus. A start time point of the resource selection window is determined based on duration required by the terminal device to perform LBT, so that as many resources in the resource selection window as possible are located after the LBT ends. Therefore, a probability that LBT succeeds before communication is performed on the reserved resource can be increased, a possibility that the terminal device sends information on the selected resource in the resource selection window and a possibility that a peer terminal device receives information on the resource can be increased, thereby reducing power consumption of the peer terminal device for receiving information. The method and the apparatus are based on a same or similar concept. Because the method and the apparatus have a similar problem-resolving principle, for implementations of the apparatus and the method, refer to each other. No repeated description is provided again.

The solutions provided in embodiments may be applied to a protocol framework such as LTE, NR, or 6G. For example, the method may be applied to a D2D scenario, for example, V2X, LTE-V, and V2V in an internet of vehicles scenario.

The internet of vehicles scenario may include, but is not limited to, intelligent driving, an intelligent connected vehicle, and the like.

Embodiments may be applied to the unlicensed spectrum. For example, embodiments may be applied to a frame based equipment (FBE) scenario in the unlicensed spectrum.

Figure 4:
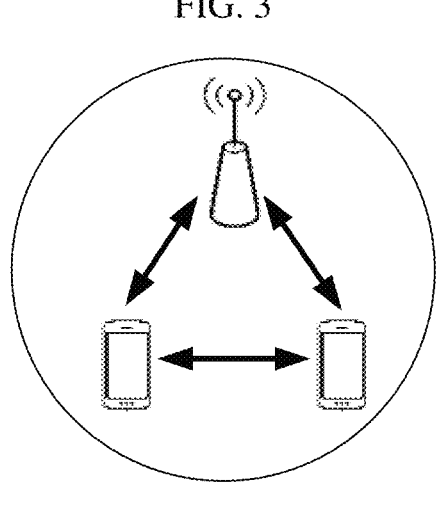
FIG. 4 is a schematic diagram of a network architecture according to an embodiment.

The solutions provided in embodiments are applicable to a mode in which a user autonomously selects a resource in a communication scenario with or without network coverage. The following describes network architectures applied to embodiments. FIG. 4 to FIG. 6 show network architectures applied to embodiments.

FIG. 4 to FIG. 6 includes a network device and two terminal devices: a terminal device 1 and a terminal device 2. As shown in FIG. 4, both the two terminal devices may be located within coverage of the network device. Alternatively, as shown in FIG. 5, only the terminal device 1 in the two terminal devices may be located within the coverage of the network device, and the terminal device 2 is not located within the coverage of the network device. Alternatively, as shown in FIG. 6, neither of the two terminal devices is located within the coverage of the network device. The two terminal devices may perform communication with each other through a sidelink. It is clear that a quantity of terminal devices in FIG. 4 to FIG. 6 is merely an example. During actual application, the network device may serve a plurality of terminal devices.

The network device in FIG. 4 to FIG. 6 is, for example, an access network device such as a base station. The access network device corresponds to different devices in different systems. For example, the access network device may correspond to an eNB in a 4th generation (the 4th generation, 4G) mobile communication technology system and correspond to a 5G access network device, for example, a gNB, in a 5G system, or is an access network device in a subsequent evolved communication system.

For example, the terminal devices in FIG. 4 to FIG. 6 are vehicle-mounted terminal devices or vehicles. However, the terminal device in embodiments is not limited thereto.

The following describes possible structures of the terminal device with reference to the accompanying drawings.

For example, FIG. 7 is a schematic diagram of a possible structure of the apparatus. The apparatus shown in FIG. 7 may be a terminal device, or may be a chip, a communication module, a remote information processor (telematics BOX, TBOX), or another combined device, part (or referred to as a component), or the like that has a function of the terminal device shown in the embodiments. The apparatus may include a processing module 710, and may further include a transceiver module 720. The transceiver module 720 may be a functional module. The functional module may complete both a sending operation and a receiving operation. For example, the transceiver module 720 may be configured to perform a sending operation and a receiving operation performed by the terminal device. For example, when the sending operation is performed, the transceiver module 720 may be considered as a sending module, and when the receiving operation is performed, the transceiver module 720 may be considered as a receiving module. Alternatively, the transceiver module 720 may be two functional modules. The transceiver module 720 may be considered as a collective name of the two functional modules. The two functional modules are respectively the sending module and the receiving module. The sending module is configured to complete the sending operation, for example, the sending module may be configured to perform the sending operation performed by the terminal device. The receiving module is configured to complete the receiving operation, and the receiving module may be configured to perform the receiving operation performed by the terminal device.

For example, when the apparatus is the terminal device, the transceiver module 720 may include a transceiver and/or a communication interface. The transceiver may include an antenna, a radio frequency circuit, and the like. The communication interface, for example, is an optical fiber interface. The processing module 710 may be a processor, for example, a baseband processor. The baseband processor may include one or more central processing units (CPUs).

When the apparatus is the part having the function of the terminal device shown in this application, the transceiver module 720 may be a radio frequency unit, and the processing module 710 may be a processor, for example, a baseband processor.

When the apparatus is a chip system, the transceiver module 720 may be an input/output interface of a chip (for example, a baseband chip), and the processing module 710 may be a processor of the chip system, and may include one or more central processing units.

It should be understood that, in this embodiment, the processing module 710 may be implemented as a processor or a processor-related circuit component, and the transceiver module 720 may be implemented as a transceiver or a transceiver-related circuit component.

In an implementation, the processing module 710 may be configured to perform an operation other than the receiving operation and the sending operation performed by the terminal device in this embodiment, for example, a processing operation; and/or is configured to support another process of the technology described, for example, determining a start time point of a resource selection window, selecting a transmission resource in the resource selection window, or processing a message, information, and/or signaling received by the transceiver module 720. The transceiver module 720 may be configured to perform the receiving and/or sending operation performed by the terminal device in this embodiment, and/or is configured to support the another process of the technology described. Optionally, the processing module 710 may control the transceiver module 720 to perform the receiving and/or sending operation.

Figure 8:
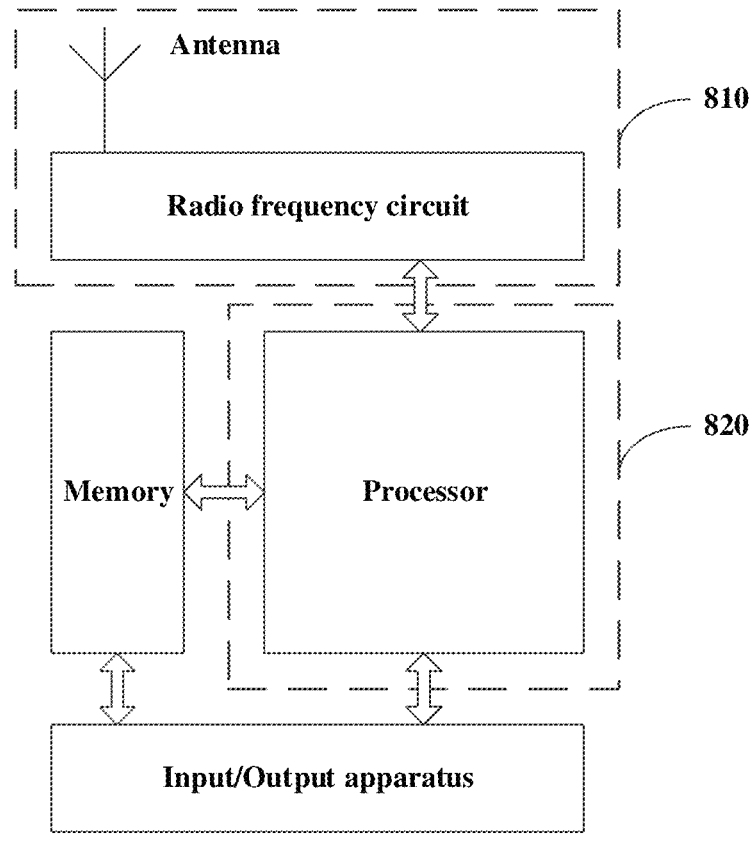
FIG. 8 is a schematic diagram of a structure of a terminal device according to an embodiment.

FIG. 8 is a schematic diagram of another possible structure of the terminal device. As shown in FIG. 8, the terminal device includes a processor, and may further include a structure such as a memory, a radio frequency unit (or a radio frequency circuit), an antenna, or an input/output apparatus. The processor is configured to process a communication protocol and communication data, control the apparatus, execute a software program, process data of the software program, and the like. The memory is configured to store the software program and the data. The radio frequency unit is configured to perform conversion between a baseband signal and a radio frequency signal, and process the radio frequency signal. The antenna is configured to receive and send a radio frequency signal in an electromagnetic wave form. The input/output apparatus, such as a touchscreen, a display screen, or a keyboard, is configured to receive data input by a user, and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited.

In this embodiment, the antenna and the radio frequency circuit that have a transceiver function may be considered as a transceiver unit of the terminal device (where the transceiver unit may be one functional unit, and the functional unit can implement a sending function and a receiving function; or the transceiver unit may include two functional units: a receiving unit that can implement the receiving function and a sending unit that can implement the sending function), and the processor having a processing function may be considered as a processing unit of the terminal device. As shown in FIG. 8, the terminal device includes a processing unit 820, and may further include a transceiver unit 810. The transceiver unit may also be referred to as a transceiver, a transceiver machine, a transceiver apparatus, or the like. The processing unit may also be referred to as a processor, a processing board, a processing module, a processing apparatus, or the like. Optionally, a device that is in the transceiver unit 810 and that is configured to implement the receiving function may be considered as a receiving unit, and a device that is in the transceiver unit 810 and that is configured to implement the sending function may be considered as a sending unit. That is, the transceiver unit 810 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 810 may correspond to the transceiver module 720, in other words, the transceiver module 720 may be implemented by the transceiver unit 810. The transceiver unit 810 is configured to perform a sending operation and a receiving operation of the terminal device in this embodiment, and/or is configured to support another process of the technology described. The processing unit 820 may correspond to the processing module 710, in other words, the processing module 710 may be implemented by the processing unit 820. The processing unit 820 is configured to perform an operation other than the receiving operation and the sending operation on the terminal device in this embodiment, for example, configured to perform the receiving and/or sending operation performed by the terminal device in this embodiment, and/or configured to support the another process of the technology described.

The network architecture and the service scenario described in embodiments are intended to describe the solutions in embodiments more clearly, and do not constitute any limitation on the solutions provided. A person of ordinary skill in the art may know that, with evolution of a network architecture and emergence of a new service scenario, the solutions provided are also applicable to a similar problem.

It should be noted that, in embodiments, an example in which a slot serves as a time unit is used for description. In a specific embodiment, the time unit may alternatively be replaced with another time unit such as a frame, a subframe, a half frame, a mini-slot, or a symbol. The time unit is not limited herein.

Figure 9:
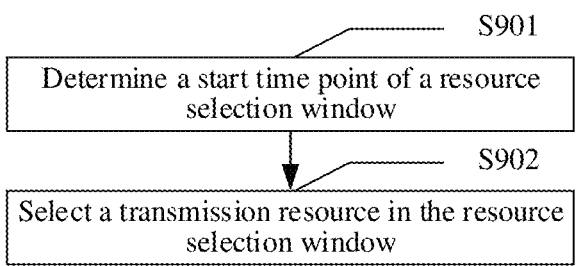
FIG. 9 is a schematic flowchart of a communication method according to an embodiment.

FIG. 9 is a schematic flowchart of the communication method provided in the embodiments. The method may be performed by a terminal device, or may be performed by a combined device or part that has a function of the terminal device, or may be performed by a communication chip (for example, a processor, a baseband chip, or a chip system) used in the terminal device.

S901. Determine a start time point of a resource selection window.

A time interval between the start time point of the resource selection window and a time point n (referred to as a first time point below) for triggering resource selection is not less than (in other words, greater than or equal to) first duration, and the first duration is duration required for the terminal device to perform first-type LBT. In an example, the first time point n may be a slot for triggering resource selection. The first duration is described in detail below.

The time point for triggering resource selection may be understood as a time point for triggering a resource selection process. The resource selection process may be a process in which the terminal device determines a PSSCH resource to be reported to a higher layer, or a process in which the terminal device determines a resource subset from resources selected by the higher layer for PSSCH/PSCCH transmission.

For example, the first-type LBT may be the fourth channel access manner in the foregoing term introduction, such as the Cat 4 LBT in the Wi-Fi protocol, or the Type 1 type LBT in the 3GPP protocol.

In an embodiment, in step S901, the start time point of the resource selection window may be determined in at least one of the following two manners:

Manner 1: When $$T_{proc,1}^{SL} > T, T \le T_1 \le T_{proc,1}^{SL}.$$

In this manner, a value of T1 is determined by the terminal device, and a value range of T1 meets $$T \le T_1 \le T_{proc,1}^{SL}.$$

Manner 2: When $$T_{proc,1}^{SL} \le T, T_1 = T.$$

In this manner, a value of T1 is T.

$$T_{proc,1}^{SL}$$

may be predefined first processing duration. The first processing duration may include a processing delay of a sensing result, processing time required for reporting the sensing result at a physical layer to a media access control (MAC) layer and completing a final resource selection procedure at the MAC layer, and processing time required for data sending, or a processing delay such as an enabling switching delay. For a definition of $$T_{proc,1}^{SL},$$

refer to Table 1. T is a quantity of slots corresponding to the first duration, and $T_1$ is a quantity of slots corresponding to the time interval between the start time point of the resource selection window and the time point n for triggering resource selection.

For example, step S901 may be performed by the processing module 710.

S902. Select a transmission resource in the resource selection window.

Step S902 may be performed by the processing module 710.

For example, a manner in which the terminal device selects the transmission resource in the resource selection window is described in detail below with reference to a manner of determining the start time point of the resource selection window.

During V2X communication, a vehicle 1 communicates with a peer vehicle in an unlicensed spectrum. If the vehicle 1 fails to perform LBT before communication is performed on a resource reserved by the vehicle 1, the vehicle 1 cannot communicate with the peer vehicle on the resource reserved by the vehicle 1. After reserving the resource, the vehicle 1 sends SCI to another vehicle to indicate that the resource is reserved. Consequently, the another vehicle cannot use the resource, and a resource waste is caused. In addition, because the vehicle 1 cannot communicate with the peer vehicle on the resource reserved by the vehicle 1, the peer vehicle cannot receive information about the vehicle 1 in a timely manner. This may cause an unexpected traffic condition. For example, when the vehicle 1 travels on a highway, a resource 1 is reserved to send travelling information (for example, a vehicle speed and a direction) of the vehicle 1 at an intersection. However, the vehicle 1 fails to perform LBT before communication is performed on the resource 1, and another vehicle does not obtain the travelling information of the vehicle 1 at the intersection from the resource 1. This causes a traffic safety risk.

In this embodiment, the start time point of the resource selection window is determined based on the duration required for the duration of the first-type LBT, so that as many resources in the resource selection window as possible are located after the LBT ends. Therefore, a probability that LBT succeeds before communication is performed on the reserved resource can be increased, thereby improving resource utilization. In addition, according to the foregoing solution, a possibility that the terminal device sends information on the selected resource in the resource selection window and a possibility that a peer terminal device receives information can be increased. In addition, in the foregoing solution, a receive-side terminal device may not need to detect information before a resource on which a transmit-side terminal device successfully performs LBT, so that power consumption of the peer terminal device for receiving information can be reduced.

In this embodiment, the first duration may be duration that is estimated by the terminal device and that may be required for the LBT, but is not duration that is actually required by the terminal device to perform LBT. When determining the first duration, the terminal device may consider a case in which a random backoff counter is interrupted during counting, or may not consider the case in which the random backoff counter is interrupted during counting. The case in which the random backoff counter is interrupted during counting may be, but is not limited to: the random backoff counter is interrupted by N reserved resources, where the N reserved resources are resources reserved in the first duration, and N is a positive integer. For example, the N reserved resources may be resources indicated to be reserved by SCI that is detected by the terminal device in a resource listening window. A specific process is as follows: the terminal device may detect the SCI in the resource listening window, and determine, based on the detected SCI, the resources reserved in the first duration. A specific manner of determining the reserved resource is described in detail in the following descriptions of a solution in which the terminal device determines the first duration in considering the case in which the random backoff counter is interrupted during counting.

The following first describes in detail the foregoing two manners of determining the first duration.

In a solution in which the terminal device determines the first duration without considering the case in which the random backoff counter is interrupted during counting, the terminal device may consider by default that no resource is reserved during counting of the random backoff counter (in other words, a quantity of reserved resources is 0). In this manner, the terminal device may estimate the first duration based on an initial value of the random backoff timer. In other words, the first duration may be determined based on the initial value of the random backoff counter corresponding to the first-type LBT. The random backoff counter may record a random backoff count selected by the terminal device in a process of performing first LBT. Alternatively, it may be understood that the initial value of the random backoff counter is an initial value of a random backoff count selected by the terminal device in the process of performing first LBT. For a specific meaning of the initial value of the random backoff count, refer to the related descriptions of the initial value of the random backoff count in the foregoing term introduction (6). Details are not described herein again.

In this solution, the first duration is determined based on the initial value of the random backoff counter corresponding to the first-type LBT, or may be understood as being determined based on the initial value of the random backoff count selected by the terminal device in the process of performing first LBT.

In an implementation, the quantity T of slots corresponding to the first duration may meet $T = \lceil (counter*9e^{-3})/2^{-\mu} \rceil$. Alternatively, it may be understood that the quantity of slots corresponding to the first duration may be determined according to the foregoing formula. counter is the initial value of the random backoff counter (or the initial value of the random backoff count selected by the terminal device in the process of performing first LBT). $9e^{-3}$ indicates nine microseconds, and is a minimum time granularity for channel resource sensing on the unlicensed frequency band. The terminal device determines, based on a sensing result, whether a channel state is idle or busy within the duration. $2^{-\mu}$ is duration corresponding to a slot in a current communication system, and is in a unit of microseconds. $\mu$ corresponds to an index of a subcarrier spacing. That $\mu$ corresponds to the subcarrier spacing may also be understood as: μ is a parameter corresponding to the subcarrier spacing. Different subcarrier spacing sizes may correspond to different values of μ. For example, for a correspondence between μ and the subcarrier spacing, refer to Table 2.

Slots of the transmit-side terminal device and the receive-side terminal device are aligned, and the transmit-side terminal device and receive-side terminal device use a resource by using a slot as a granularity, and use the slot as the granularity to represent a start location of the resource. In the foregoing formula, rounding is performed, so that the transmit-side terminal device can send valid data of information at a location of an integer multiple of the slot. A meaning of rounding may be represented as an index of the first complete slot that can be used by the transmit-side terminal device.

Optionally, when (counter*9e$^{-3}$) is not an integer multiple of $2^{-\mu}$, or when backoff succeeds and a moment at which a value of the backoff counter decreases to 0 is not an integer multiple of $2^{-\mu}$, to preempt a resource, the transmit-side terminal device may send, between a moment n+(counter*9e$^{-3}$) and a moment n+T, information such as placeholder information, redundant information, independent control information, or replication information of the first complete frame.

Correspondingly, the quantity $T_1$ of slots of the interval between the start time point n+$T_1$ of the resource selection window [n+$T_1$,n+$T_2$] and the time point n for triggering resource selection meets the following condition:

When $$T_{proc,1}^{SL} > \lceil (\text{counter} * 9e^{-3}) / 2^{-\mu} \rceil,$$

$$\lceil (\text{counter} * 9e^{-3}) / 2^{-\mu} \rceil \le T_1 \le T_{proc,1}^{SL},$$

where the value of T1 is determined by the terminal device, and the value range of T1 meets $$\lceil (\text{counter} * 9e^{-3}) / 2^{-\mu} \rceil \le T_1 \le T_{proc,1}^{SL};$$

and when $$T_{proc,1}^{SL} \le \lceil (\text{counter} * 9e^{-3}) / 2^{-\mu} \rceil, T_1 = \lceil (\text{counter} * 9e^{-3}) / 2^{-\mu} \rceil.$$

Figure 10:
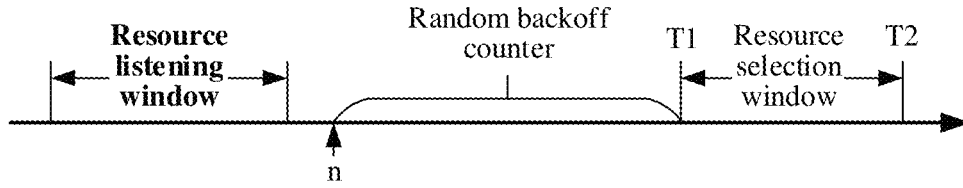
FIG. 10 is a schematic diagram of a resource selection window according to an embodiment.

For example, the resource selection window may be shown in FIG. 10.

It may be understood that, in this embodiment, only a slot is used as an example for description. In a specific implementation, another time unit may alternatively be used, for example, a symbol, a frame, a subframe, a half frame, or a control information sending interval. A time unit A is used as an example. The quantity of slots corresponding to the first duration or $2^{-\mu}$ related to the quantity of slots of the interval between the start time point of the resource selection window and the time point for triggering resource selection may be replaced with XXX. XXX is duration of the time unit A, and a unit is millisecond, to obtain a quantity of time units A corresponding to the first duration or a quantity of time units A of the interval between the start time point of the resource selection window and the time point for triggering resource selection. For example, when the subcarrier spacing is 30 kHz, the time unit A is a subframe, and XXX is 0.5 millisecond. For another example, when the subcarrier spacing is 30 kHz, the time unit A is a half frame, and XXX is 0.25 millisecond.

For example, the quantity a of A corresponding to the first duration may meet a=$\lceil$ (counter*9e$^{-3}$)/XXX$\rceil$, and the quantity a1 of time units A of the interval between the start time point of the resource selection window and the time point for triggering resource selection may meet: when $$T_{proc,1}^{SL} > \lceil (\text{counter} * 9e^{-3}) / XXX \rceil, \lceil (\text{counter} * 9e^{-3}) / XXX \rceil \le a1 \le T_{proc,1}^{SL};$$

or when $$T_{proc,1}^{SL} \le \lceil (\text{counter} * 9e^{-3}) / XXX \rceil, a1 = \lceil (\text{counter} * 9e^{-3}) / XXX \rceil.$$

Similar processing may also be performed on the quantity of slots corresponding to the first duration or the quantity of slots of the interval between the start time point of the resource selection window and the time point for triggering resource selection in the following, to obtain the quantity of time units A corresponding to the first duration or the quantity of time units A of the interval between the start time point of the resource selection window and the time point for triggering resource selection. No repeated description is provided again.

Further, in a specific implementation, a first interval during the first-type LBT may be considered when the first duration is determined. In other words, the first duration may be determined based on the initial value of the random backoff counter corresponding to the first-type LBT and the first interval during the first-type LBT.

The first interval may be understood as idle duration of the channel during the first-type LBT, for example continuous idle duration of the channel that the terminal device needs to wait for when performing LBT. Values of intervals during different types of LBT are different. For example, in the first channel access manner (corresponding to the Cat 1 LBT in the Wi-Fi protocol or the Type 2B type LBT in the 3GPP protocol), an interval may be the SIFS; and in the second channel access manner (corresponding to the Cat 2 LBT in the Wi-Fi protocol, or the Type 2A type LBT in the 3GPP protocol), an interval may be the PIFS. In this embodiment, the first interval may be DIFS duration in the Wi-Fi protocol, or the first interval may be defer duration in the 3GPP protocol. It may be understood that the first interval may also be referred to as first lasting duration, first preset duration, or the like.

According to the foregoing implementation solution, the quantity T of slots corresponding to the first duration may meet T=$\lceil$ (counter*9e$^{-3}$+t)2$^{-\mu}$$\rceil$. Alternatively, it may be understood that the quantity of slots corresponding to the first duration may be determined according to the foregoing formula. t is the first interval.

Correspondingly, a slot $T_1$ of the interval between the start time point n+$T_1$ of the resource selection window [n+$T_1$,n+$T_2$] and the time point n for triggering resource selection meets: when $$T^{SL}_{proc,1} > \lceil (\text{counter} * 9e^{-3} + t)/2^{-\mu} \rceil,$$

$$\lceil (\text{counter} * 9e^{-3} + t)/2^{-\mu} \rceil \leq T_1 \leq T^{SL}_{proc,1};$$

or when $$T^{SL}_{proc,1} \leq \lceil (\text{counter} * 9e^{-3} + t)/2^{-\mu} \rceil, \quad T_1 = \lceil (\text{counter} * 9e^{-3} + t)/2^{-\mu} \rceil.$$

Figure 11:
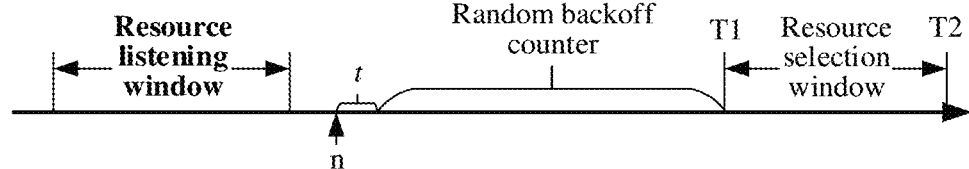
FIG. 11 is a schematic diagram of another resource selection window according to an embodiment.

For example, the resource selection window may be shown in FIG. 11.

Figure 12:
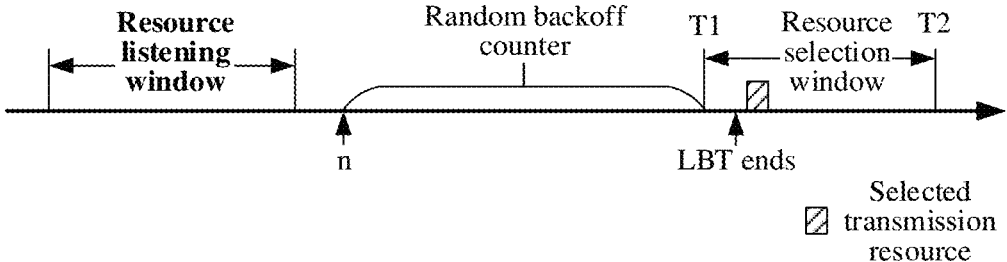
FIG. 12 is a schematic diagram of a type of resource selection according to an embodiment.
Figure 13:
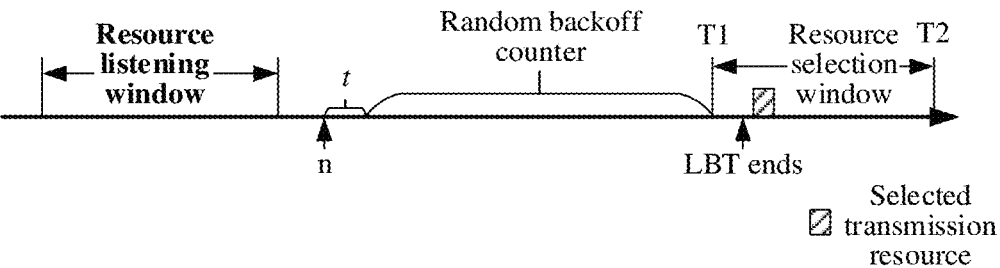
FIG. 13 is a schematic diagram of another type of resource selection according to an embodiment.

In the solution in which the terminal device determines the first duration without considering the case in which the random backoff counter is interrupted during counting, an implementation of step S902 is as follows: The transmission resource (or an occupied COT) may be selected in a first resource set in a chronological front-to-back order. The first resource set is a subset of a candidate resource set in the resource selection window, and the first resource set includes a candidate resource that is in the resource selection window and that is located after an end time point of the LBT. For example, the first resource set may include all candidate resources that are in the resource selection window and that are located after the end time point of the LBT, or the first resource set may include a part of candidate resources that are in the resource selection window and that are located after the end time point of the LBT. The selected transmission resource may be shown in FIG. 12 or FIG. 13.

In the foregoing implementation, the resource that is in the resource selection window and that is located after a time point at which the LBT ends is selected in a chronological front-to-back order, so that an LBT access success rate can be increased, thereby increasing a possibility of performing communication on the selected resource.

In the solution in which the terminal device determines the first duration with considering the case in which the random backoff counter is interrupted during counting, the terminal device may first determine a reserved resource (where it is assumed that there are N reserved resources) during counting of the random backoff counter. The terminal device determines duration for which the random backoff counter is interrupted by the N reserved resources, so that the first duration may be determined based on the initial value of the random backoff timer and the duration for which the random backoff counter is interrupted by the N reserved resources. In other words, the first duration may be determined based on the random backoff counter corresponding to the first-type LBT and second duration. The second duration is duration for which the random backoff counter corresponding to the first-type LBT is interrupted by the N reserved resources.

In a random backoff process of the terminal device, if another terminal device sends a signal in a slot, the random backoff counter is interrupted. Consequently, time required for the LBT success is increased. In the foregoing solution, the duration for which the random backoff counter is interrupted is considered when the start time point of the resource selection window is determined, so that an LBT access success rate can be further increased, thereby increasing a possibility that the terminal device sends information on the selected resource in the resource selection window.

In an implementation, the second duration is a quantity of slots occupied by the N reserved resources. In this case, the quantity T of slots corresponding to the first duration may meet $$T = \left( \left\lceil \frac{\text{counter} * 9e^{-3}}{2^{-\mu}} \right\rceil + \sum_1^N \text{reservation}_i \right).$$

Alternatively, it may be understood that the quantity of slots corresponding to the first duration may be determined according to the foregoing formula.

For parameters of counter and $\mu$, refer to the foregoing descriptions, and details are not described herein again. $\text{reservation}_i$ is a quantity of slots occupied by an $i^{th}$ reserved resource in the N reserved resources for the random backoff counter, and $1 \leq i \leq N$. For example, assuming that one reserved resource occupies one slot, the quantity of slots corresponding to the second duration is N.

Correspondingly, the quantity $T_1$ of slots of the interval between the start time point $n+T_1$ of the resource selection window $[n+T_1, n+T_2]$ and the time point n for triggering resource selection meets: when $$T^{SL}_{proc,1} > \left( \left\lceil \frac{\text{counter} * 9e^{-3}}{2^{-\mu}} \right\rceil + \sum_1^N \text{reservation}_i \right),$$

$$\left( \left\lceil \frac{\text{counter} * 9e^{-3}}{2^{-\mu}} \right\rceil + \sum_1^N \text{reservation}_i \right) \leq T_1 \leq T^{SL}_{proc,1},$$

where the value of T1 is determined by the terminal device, and the value range of T1 meets $$\left( \left\lceil \frac{\text{counter} * 9e^{-3}}{2^{-\mu}} \right\rceil + \sum_1^N \text{reservation}_i \right) \leq T_1 \leq T^{SL}_{proc,1};$$

or when $$T^{SL}_{proc,1} \leq \left( \left\lceil \frac{\text{counter} * 9e^{-3}}{2^{-\mu}} \right\rceil + \sum_1^N \text{reservation}_i \right),$$

$$T_1 = \left( \left\lceil \frac{\text{counter} * 9e^{-3}}{2^{-\mu}} \right\rceil + \sum_1^N \text{reservation}_i \right).$$

Figure 14:
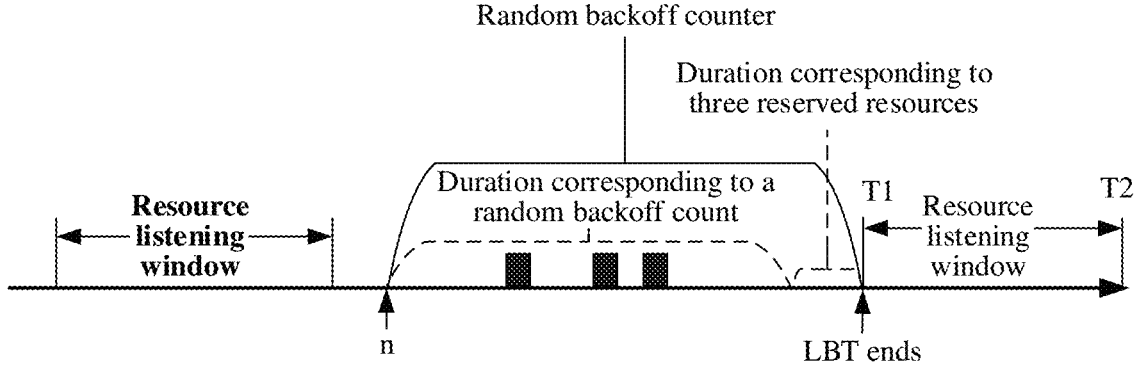
FIG. 14 is a schematic diagram of a resource selection window according to an embodiment.

For example, assuming that N is 3, and one reserved resource occupies one slot, the resource selection window may be shown in FIG. 14.

In another implementation, the second duration may be determined based on the quantity of slots occupied by the N reserved resources and N first intervals. In this case, the quantity T of slots corresponding to the first duration may meet $$T = \left( \left\lceil \frac{\text{counter} * 9e^{-3} + N \times t}{2^{-\mu}} \right\rceil + \sum_1^N \text{reservation}_i \right).$$

t is the first interval. Alternatively, it may be understood that the quantity of slots corresponding to the first duration may be determined according to the foregoing formula.

Correspondingly, the quantity $T_1$ of slots of the interval between the start time point $n+T_1$ of the resource selection window $[n+T_1, n+T_2]$ and the time point n for triggering resource selection meets: when

23

$$T_{proc,1}^{SL} > \left( \left( \left\lceil \frac{counter*9e^{-3}+N \times t}{2^{-\mu}} \right\rceil + \sum\nolimits_1^N reservation_i \right) \right),$$

$$\left( \left( \left\lceil \frac{counter*9e^{-3}+N \times t}{2^{-\mu}} \right\rceil + \sum\nolimits_1^N reservation_i \right) \right) \leq T_1 \leq T_{proc,1}^{SL},$$

where the value of T1 is determined by the terminal device, and the value range of T1 meets $$\left( \left\lceil \frac{counter*9e^{-3}+N \times t}{2^{-\mu}} \right\rceil + \sum\nolimits_1^N reservation_i \right) \leq T_1 \leq T_{proc,1}^{SL};$$

or when $$T_{proc,1}^{SL} \leq \left( \left( \left\lceil \frac{counter*9e^{-3}+N \times t}{2^{-\mu}} \right\rceil + \sum\nolimits_1^N reservation_i \right) \right),$$

$$T_1 = \left( \left( \left\lceil \frac{counter*9e^{-3}+N \times t}{2^{-\mu}} \right\rceil + \sum\nolimits_1^N reservation_i \right) \right).$$

In the foregoing example, the first interval at which the terminal device performs LBT after the random backoff counter is interrupted by the reserved resource each time is considered, so that accuracy of time required for LBT can be improved.

Figure 15:
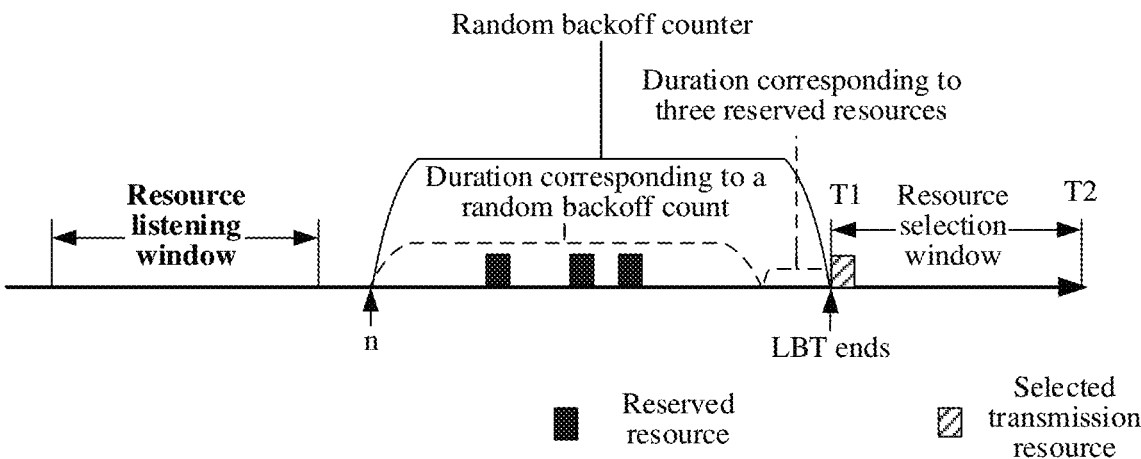
FIG. 15 is a schematic diagram of a type of resource selection according to an embodiment.

In the solution in which the terminal device determines the first duration with considering the case in which the random backoff counter is interrupted during counting, an implementation of step S902 is as follows: The transmission resource (or an occupied COT) may be selected in a candidate resource set in the resource selection window in a chronological front-to-back order. For example, the selected transmission resource may be shown in FIG. 15.

In the foregoing implementation, the resource that is in the resource selection window and that is located after a time point at which the LBT ends is selected in a chronological front-to-back order, so that a possibility that the LBT succeeds before communication is successfully performed on the reserved resource and an LBT access success rate can be increased, thereby increasing a possibility of performing communication on the selected resource.

The following describes the manner of determining the reserved resource.

In a possible implementation, the terminal device may detect the SCI in the resource listening window. If the SCI meets the following condition, the terminal device may determine that the resource indicated by the SCI is the reserved resource: a reference signal received power (RSRP) corresponding to the SCI is greater than a first threshold, where the first threshold is an RSRP threshold used for resource selection. For example, the first threshold may be a threshold used for resource exclusion in a user-selected resource mode (mode-2), and the threshold may be a function of a priority corresponding to data indicated in the received SCI and a priority corresponding to to-be-sent data of the terminal device.

In the user-selected resource mode (mode-2), when the RSRP corresponding to the SCI is greater than the first threshold, the resource indicated by the SCI is excluded from the candidate resource set corresponding to the resource selection window. In this implementation, the RSRP of the SCI is compared with the first threshold. When the RSRP corresponding to the SCI is greater than the first threshold, it may be determined that the resource indicated by the SCI is the reserved resource that interrupts the random backoff counter.

In another implementation, the terminal device may detect the SCI in the resource listening window. If the SCI meets the following condition, the terminal device may determine that the resource indicated by the SCI is the reserved resource: a received signal strength indicator (RSSI) corresponding to the SCI is greater than a second threshold, where the second threshold is an RSSI threshold used for LBT. For example, the second threshold may be a threshold for determining whether the channel is idle in an LBT process.

In the LBT process, when the RSSI corresponding to the SCI is greater than the second threshold, it may be determined that the channel is not idle. In this implementation, the RSSI of the SCI is compared with the second threshold. When the RSSI corresponding to the SCI is greater than the second threshold, it may be determined that the resource indicated by the SCI is the reserved resource that interrupts the random backoff counter.

In still another implementation, the terminal device may detect the SCI in the resource listening window. If the SCI meets the following condition, the terminal device may determine that the resource indicated by the SCI is the reserved resource: An RSRP corresponding to the SCI is greater than a first threshold, and/or an RSSI corresponding to the SCI is greater than a second threshold.

This implementation is a combination of the foregoing two implementations. If the SCI meets either of the foregoing two conditions (for example, condition 1: the RSRP is greater than the first threshold, and condition 2: the RSSI is greater than the second threshold), it may be determined that the resource indicated by the SCI is the reserved resource that interrupts the random backoff counter.

Optionally, if the resource indicated by the SCI is the reserved resource that interrupts the random backoff counter, in addition to the condition described in the foregoing three implementations, the following condition is further met: The indicated reserved resource may be located before a PDB moment.

Based on the foregoing three implementations, the terminal device may determine that M pieces of SCI detected in the resource listening window meet the foregoing condition and the N reserved resources indicated by the M pieces of SCI are located before the PDB moment. In this case, the N reserved resources indicated by the M pieces of SCI may be used to determine the first duration.

The foregoing describes the manner of determining the reserved resource. The following describes a possible manner of determining the first duration based on the reserved resource. The first duration may be determined by using the following process.

A1. Determine whether there is a reserved resource in a first time window, and if there is a reserved resource in the first time window, perform step A2, or if there is no reserved resource in the first time window, perform step A3.

A start location of the first time window is the time point n for triggering resource selection, and an end location may be determined based on the random backoff counter, and may be a moment at which the value of the random backoff timer decreases to 0. An initial end location of the first time window is n+(counter*9e^{-3}+t). For a manner of determining the reserved resource in the first time window, refer to the foregoing descriptions. Details are not described herein again.

Alternatively, it may be understood that the first interval t may not be considered in the foregoing step, that is, the initial end location of the first time window is $n+(counter*9e^{-3})$.

A2. Update the end location of the first time window based on the reserved resource included in the first time window, and perform A1.

Assuming that the first time window includes $N_j$ reserved resources, it is determined that the random backoff counter is delayed at least $$t \times N_j + \sum_{i=0}^{N_j}$$

reservation$_i$. reservation$_i$ is a quantity of slots corresponding to duration for which the random backoff counter is interrupted by an $i^{th}$ reserved resource in the $N_j$ reserved resources. In this case, when the first interval t after the reserved resource is considered, the end location of the first time window is $$n + \left(counter*9e^{-3} + t\right)t \times N_j + \sum_{i=0}^{N_j} S_i.$$

When the first interval t after the reserved resource is not considered, the initial end location of the first time window is $$n + \left(counter*9e^{-3}\right) + \sum_{i=0}^{N_j} S_i.$$

A3. Determine that duration corresponding to the first time window is the first duration.

Optionally, when the terminal device needs to select more than one transmission resource (or occupy more than one COT) in the resource selection window, the LBT is met between transmission resources (or COTs). For example, assuming that the terminal device needs to occupy P COTs in the resource selection window, the terminal device may randomly generate P initial values of a random backoff count at the first time point n, determine, based on one of the P initial values of the random backoff count according to the foregoing solution, the start time point of the resource selection window, and occupy the first COT. After the first COT is occupied, the start time point of the resource selection window may be re-determined based on another initial value of the random backoff count according to the foregoing solution, and the second COT is occupied. The rest may be deduced by analogy.

For example, in this embodiment, the transmission resource selected by the terminal device may use a channel as a granularity in frequency domain, and a granularity in time domain may be a time unit such as a slot, or may be a COT, where the COT includes a plurality of continuous slots.

In this embodiment, the start time point of the resource selection window is determined based on the end time point of the LBT, so that as many resources in the resource selection window as possible are located after the LBT ends. Therefore, a probability that LBT succeeds before communication is performed on the reserved resource can be increased, thereby increasing a possibility that the terminal device sends information on the selected resource in the resource selection window. According to the solution provided in this embodiment, after receiving indication information (where the indication information indicates the transmission resource or the occupied COT) sent by a transmit-side terminal device, a receive-side terminal device may start to enter a receiving state at a location indicated by the indication information, and does not need to perform detection and receiving between the location and a location where the indication information is received, so that power consumption of the receive-side terminal device can be reduced.

An embodiment provides a communication apparatus. The communication apparatus may be configured to implement the function of the terminal device in the foregoing embodiments. For example, the communication apparatus may be the terminal device, for example, an integrated terminal device such as a vehicle-mounted terminal device or a roadside unit RSU. Alternatively, the communication apparatus may be an apparatus that can support the terminal device in implementing the function, for example, a chip, a module, or a TBOX used in the terminal device, or another combined device or part (or referred to as a component) that has the function of the terminal device in the embodiments. For example, the communication apparatus may be a chip, a module, a component, or the like in a device such as the vehicle-mounted terminal device or the roadside unit. The communication apparatus may include the structures/structure shown in FIG. 7 and/or FIG. 8.

An embodiment further provides a non-transitory computer-readable storage medium. The non-transitory computer-readable storage medium stores a computer program. When the computer program is executed by a computer, the computer may implement a procedure related to the terminal device in the foregoing embodiments.

An embodiment further provides a computer program product. The computer program product is configured to store a computer program. When the computer program is executed by a computer, the computer may implement a procedure related to the terminal device in the foregoing embodiments.

An embodiment further provides a chip or a chip system. The chip may include a processor. The processor may be configured to invoke a program or instructions in a memory, to perform a procedure related to the terminal device in the foregoing embodiments. The chip system may include the chip, and may further include another component such as the memory or a transceiver.

An embodiment further provides a circuit. The circuit may be coupled to a memory, and may be configured to perform a procedure related to the terminal device in the foregoing embodiments. The chip system may include the chip, and may further include another component such as the memory or a transceiver.

A person skilled in the art should understand that embodiments may be provided as a method, a system, or a computer program product. Therefore, the embodiments may use a form of hardware only embodiments, software only embodiments, or embodiments with a combination of software and hardware. In addition, the embodiments may use a form of a computer program product that is implemented on one or more non-transitory computer-usable storage media (including, but not limited to, a disk memory, a CD-ROM, an optical memory, and the like) that include computer-usable program code.

is the embodiments are described with reference to the flowcharts and/or block diagrams of the methods, the devices (systems), and the computer program product according to the embodiments. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more procedures in the flowcharts and/or in one or more blocks in the block diagrams.

These computer program instructions may be stored in a non-transitory computer-readable memory that can indicate the computer or the another programmable data processing device to work in a specific manner, so that the instructions stored in the non-transitory computer-readable memory generate an artifact that includes an instruction apparatus. The instruction apparatus implements the specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, so that computer-implemented processing is generated. Therefore, the instructions executed on the computer or the another programmable device provide steps for implementing the specific function in one or more procedures in the flowcharts and/or in one or more blocks in the block diagrams.

It is clear that a person skilled in the art can make various modifications and variations to the embodiments without departing from their spirit and scope. The embodiments are intended to cover these modifications and variations provided that they fall within the scope of defined by the embodiments and their equivalent technologies.

What is claimed is:

1. A method, comprising:
determining a start time point of a resource selection window, wherein a time interval between the start time point of the resource selection window and a first time point is not less than first duration, the first time point is a time point for triggering resource selection, and the first duration is duration required for a terminal device to perform first-type listen-before-talk (LBT); and
selecting a transmission resource in the resource selection window,
wherein a quantity $T_1$ of slots corresponding to the time interval between the start time point of the resource selection window and the first time point meets:
when $$T_{proc,1}^{SL} > T, T \leq T_1 \leq T_{proc,1}^{SL};$$

and/or
when $$T_{proc,1}^{SL} \leq T, T_1 = T,$$

wherein $$T_{proc,1}^{SL}$$

is a predefined first processing duration, and T is a quantity of slots corresponding to the first duration.

2. The method according to claim 1, wherein the first duration is determined based on an initial value of a random backoff counter corresponding to the first-type LBT.

3. The method according to claim 2, wherein a quantity T of slots corresponding to the first duration meets:

$$T = \lceil (counter*9e^{-3})/2^{-\mu} \rceil, \text{wherein}$$

counter is the initial value of the random backoff counter, and u corresponds to a subcarrier spacing.

4. The method according to claim 2, wherein selecting the transmission resource in the resource selection window comprises:
selecting the transmission resource in a first resource set in a chronological front-to-back order, wherein the first resource set is a subset of candidate resources in the resource selection window, and the first resource set comprises a candidate resource that is in the resource selection window and that is located after an end time point of the LBT.

5. The method according to claim 1, wherein the first duration is determined based on an initial value of a random backoff counter corresponding to the first-type LBT and second duration, wherein
the second duration is a quantity of slots occupied by N reserved resources, or the second duration is determined based on the quantity of slots occupied by the N reserved resources and N first intervals, the first interval is idle duration of a channel after a corresponding reserved resource, the first interval and the corresponding reserved resource are continuous in time domain, the N reserved resources are resources reserved in the first duration, and N is a positive integer.

6. The method according to claim 5, wherein a quantity T of slots corresponding to the first duration meets:

$$T = \left( \left\lceil \frac{counter*9e^{-3}}{2^{-\mu}} \right\rceil + \sum_{1}^{N} reservation_i \right),$$

wherein
counter is the initial value of the random backoff counter, $\mu$ corresponds to a subcarrier spacing, and reservation$_i$ is a quantity of slots occupied by an $i^{th}$ reserved resource in the N reserved resources.

7. The method according to claim 5, wherein a quantity T of slots corresponding to the first duration meets:

$$T = \left( \left\lceil \frac{counter*9e^{-3} + N \times t}{2^{-\mu}} \right\rceil + \sum_{1}^{N} reservation_i \right),$$

wherein
counter is the initial value of the random backoff counter, $\mu$ corresponds to a subcarrier spacing, reservation$_i$ is a quantity of slots occupied by an $i^{th}$ reserved resource in the N reserved resources, and t is the first interval.

8. The method according to claim 5, wherein the N reserved resources are indicated by M pieces of sidelink control information in a resource listening window, and M is a positive integer, wherein:

a reference signal received power (RSRP) corresponding to each of the M pieces of sidelink control information is greater than a first threshold, and the first threshold is an RSRP threshold used for resource selection; or a received signal strength indicator (RSSI) corresponding to each of the M pieces of sidelink control information is greater than a second threshold, and the second threshold is an RSSI threshold used for LBT; or an RSRP corresponding to each of the M pieces of sidelink control information is greater than a first threshold, and an RSSI corresponding to each of the M pieces of sidelink control information is greater than a second threshold.

9. A communication apparatus, comprising:

one or more processors configured to:

determine a start time point of a resource selection window, wherein a time interval between the start time point of the resource selection window and a first time point is not less than first duration, the first time point is a time point for triggering resource selection, and the first duration is duration required for a terminal device to perform first-type listen-before-talk (LBT); and select a transmission resource in the resource selection window, wherein a quantity $T_1$ of slots corresponding to the time interval between the start time point of the resource selection window and the first time point meets:

when $$T_{proc,1}^{SL} > T, T \leq T_1 \leq T_{proc,1}^{SL};$$

and/or when $$T_{proc,1}^{SL} \leq T, T_1 = T,$$

wherein $$T_{proc,1}^{SL}$$

is a predefined first processing duration, and T is a quantity of slots corresponding to the first duration.

10. The communication apparatus according to claim 9, wherein the first duration is determined based on an initial value of a random backoff counter corresponding to the first-type LBT.

11. The communication apparatus according to claim 10, wherein a quantity T of slots corresponding to the first duration meets:

$$T = \lceil (counter*9e^{-3})/2^{-\mu} \rceil, \text{ wherein}$$

counter is the initial value of the random backoff counter, and μ corresponds to a subcarrier spacing.

12. The communication apparatus according to claim 10, wherein, when selecting the transmission resource in the resource selection window, the one or more processors are further configured to:

select the transmission resource in a first resource set in a chronological front-to-back order, wherein the first resource set is a subset of candidate resources in the resource selection window, and the first resource set comprises a candidate resource that is in the resource selection window and that is located after an end time point of the LBT.

13. The communication apparatus according to claim 9, wherein the first duration is determined based on an initial value of a random backoff counter corresponding to the first-type LBT and second duration, the second duration is duration for which the random backoff counter corresponding to the first-type LBT is interrupted by N reserved resources, the N reserved resources are resources reserved in the first duration, and N is a positive integer.

14. The communication apparatus according to claim 13, wherein a quantity T of slots corresponding to the first duration meets:

$$T = \left( \left\lceil \frac{counter*9e^{-3}}{2^{-\mu}} \right\rceil + \sum_1^N reservation_i \right),$$

wherein counter is the initial value of the random backoff counter, μ corresponds to a subcarrier spacing, and reservation$_i$ is a quantity of slots occupied by an $i^{th}$ reserved resource in the N reserved resources.

15. The communication apparatus according to claim 13, wherein a quantity T of slots corresponding to the first duration meets:

$$T = \left( \left\lceil \frac{counter*9e^{-3} + N \times t}{2^{-\mu}} \right\rceil + \sum_1^N reservation_i \right),$$

wherein counter is the initial value of the random backoff counter, μ corresponds to a subcarrier spacing, reservation$_i$ is a quantity of slots occupied by an $i^{th}$ reserved resource in the N reserved resources, and t is a first interval.

16. The communication apparatus according to claim 13, wherein the N reserved resources are indicated by M pieces of sidelink control information in a resource listening window, and M is a positive integer, wherein:

a reference signal received power RSRP corresponding to each of the M pieces of sidelink control information is greater than a first threshold, and the first threshold is an RSRP threshold used for resource selection; or a received signal strength indicator RSSI corresponding to each of the M pieces of sidelink control information is greater than a second threshold, and the second threshold is an RSSI threshold used for LBT; or an RSRP corresponding to each of the M pieces of sidelink control information is greater than a first threshold, and an RSSI corresponding to each of the M pieces of sidelink control information is greater than a second threshold.

17. A non-transitory computer-readable storage medium, comprising executable instructions, wherein the executable instructions, when executed by a computer, cause the computer to:

determine a start time point of a resource selection window, wherein a time interval between the start time point of the resource selection window and a first time point is not less than first duration, the first time point is a time point for triggering resource selection, and the first duration is duration required for a terminal device to perform first-type listen-before-talk, LBT; and select a transmission resource in the resource selection window, wherein a quantity $T_1$ of slots corresponding to the time interval between the start time point of the resource selection window and the first time point meets:

when $$T_{proc,1}^{SL} > T, \, T \leq T_1 \leq T_{proc,1}^{SL};$$

and/or when $$T_{proc,1}^{SL} \leq T, \, T_1 = T,$$

wherein $$T_{proc,1}^{SL}$$

is a predefined first processing duration, and T is a quantity of slots corresponding to the first duration.

\* \* \* \* \*